United States Patent Office 3,037,560
Patented June 5, 1962

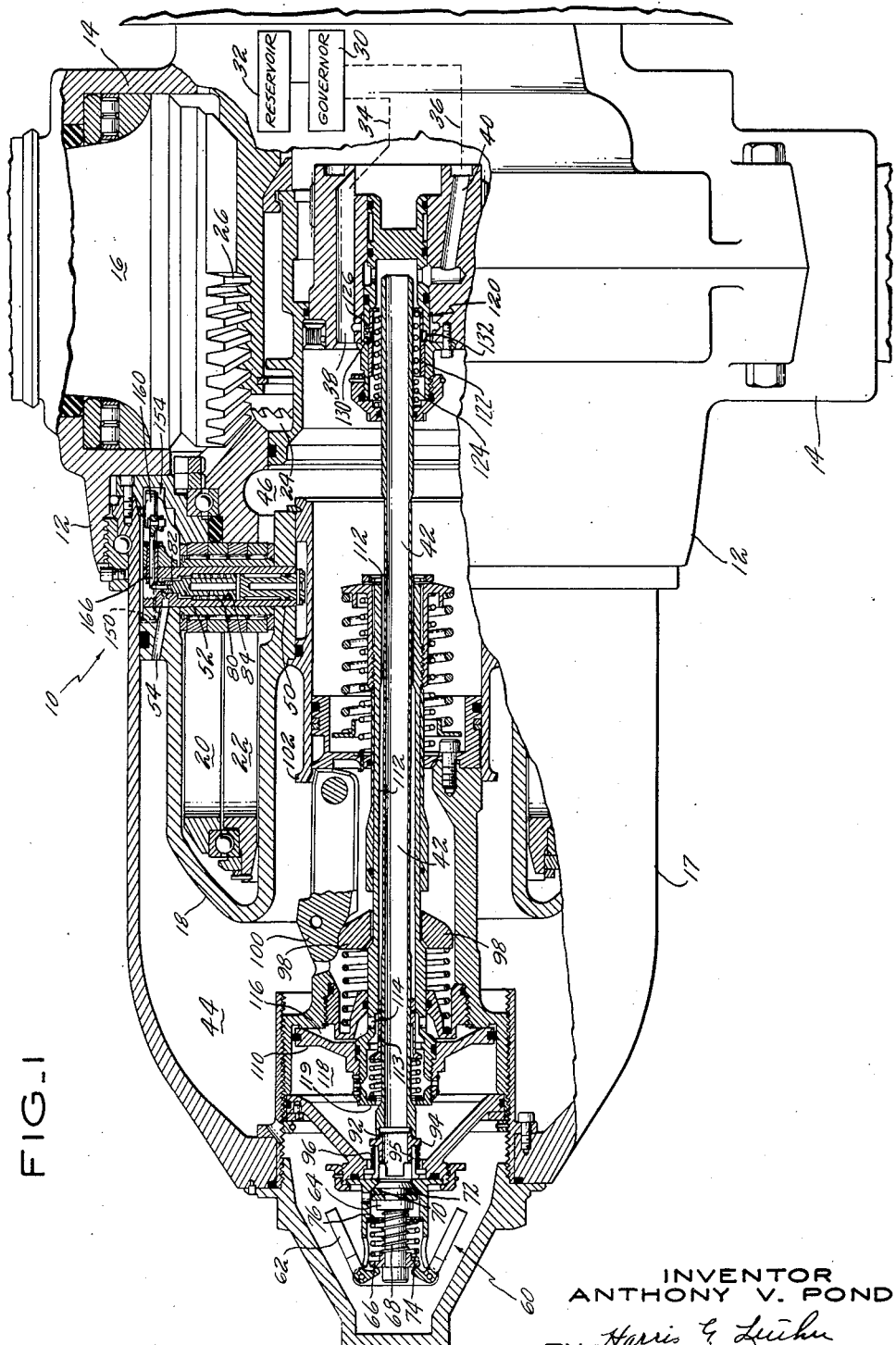

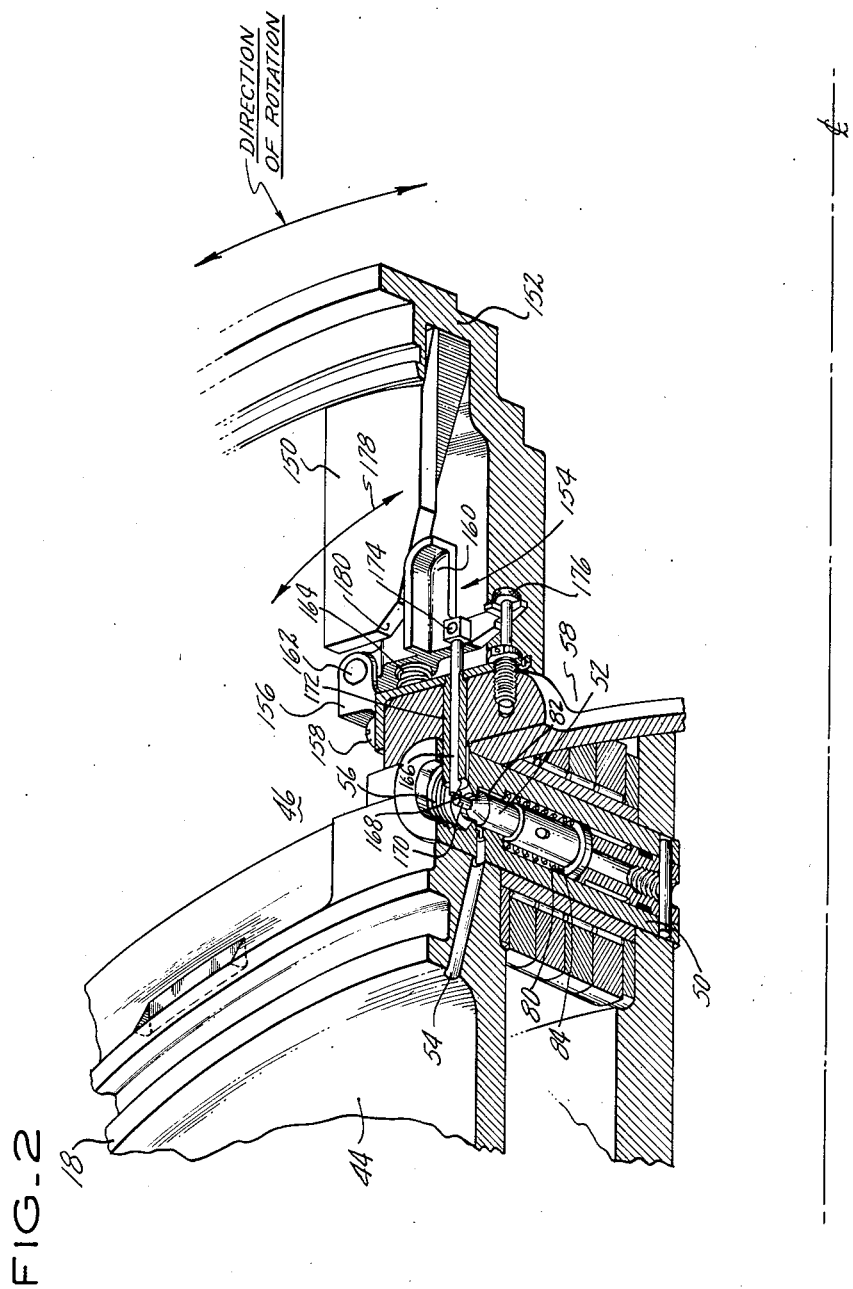

3,037,560
PITCH LOCK DISARMER
Anthony V. Pond, Manchester, Conn., assignor to United Aircraft Corporation, East Hartford, Conn., a corporation of Delaware
Filed Sept. 29, 1959, Ser. No. 843,114
11 Claims. (Cl. 170—160.21)

This invention relates to variable pitch propellers and more particularly to mechanisms for locking the blades against pitch change.

Copending application Ser. No. 591,465, filed June 14, 1956 by Raymond P. Lambeck, now Patent No. 2,928,477, and having a common assignee with the present application, claims and describes a hydraulic pitch lock for variable pitch propellers, which pitch lock operates to trap fluid on one side of a pitch changing servo motor and on which the present structure is an improvement.

It is an object of this invention to provide, among other things, a means for positively disabling or disengaging a portion of the pitch lock in order to permit other pitch change operations.

It is a further object of this invention to disable the bleed valve portion of the pitch lock at pitch positions adjacent the low pitch of the propeller as defined by the low pitch stop.

A further object is mechanism permitting material overspeeding of the engine without completely locking the pitch when the propeller blades are adjacent the low pitch stop, but locking the blades against pitch reduction on comparatively small overspeed in other blade positions. A still further object is mechanism preventing the bleed valve of the pitch lock from closing on normal transient overspeeds when the blades are adjacent their low pitch position but responsive to smaller overspeeds at higher pitch positions.

These and other objects of this invention will become readily apparent from the following description of the drawings in which:

FIG. 1 is a partial cross-sectional view of a propeller with certain parts being shown schematically.

FIG. 2 is a detailed perspective view of the centrifugally operated bleed valve and the disabling cam.

As indicated in the above application and Patent No. 2,855,057, the main pitch lock valve is set to operate at a speed between the normal cruise speed and the normal take-off speed, i.e., at a speed somewhat below the normal maximum r.p.m. while the bleed valve is set to operate at a speed above the normal maximum r.p.m.

The hydraulic pitch lock bleed valve is an r.p.m. sensitive device and should remain open during normal operation to provide continuous circulation of warm hydraulic fluid through the propeller to prevent congealing of the fluid in the propeller under cold atmospheric conditions.

Once the bleed valve closes, it will not open again under normal operation. The propeller speed must be greatly reduced to reduce the centrifugal force on the valve so that the valve opening spring can overcome both the centrifugal closing force on the valve and the valve closing differential pressure resulting from the pressures on the substantially equal areas at opposite sides of the valve. The pressure on the high pitch side of the motor and valve is greater than that on the low pitch side because of blade centrifugal twisting moment which is transmitted through the pitch changing mechanism to the pitch changing motor and is opposed by hydraulic pressure on the high pitch side of the motor.

The r.p.m. at which the pitch lock bleed valve is actuated to close the valve is established by two considerations. One, the r.p.m. must be above the normal operating range so that the bleed valve is not actuated and closed during normal operation. Two, the actuating r.p.m. should, however, be as low as possible to minimize damage to the engine by preventing pitch reduction and further speed increases when operating at speeds above the normal operating range. The factor which prevents the setting of the pitch lock bleed valve for actuation at speeds only slightly above normal maximum engine r.p.m. is normal transient overspeed. This transient oversepeed occurs during large rapid throttle movements with the propeller at or near the low pitch stops. To prevent the pitch lock bleed valve from closing during the normal transient overspeed, the pitch lock bleed r.p.m. has previously been set to operate only at speeds above the transient overspeed r.p.m. The pitch lock bleed is therefore set to close at a speed which could result in damage to the engine. To overcome the influence of transient overspeeds and thereby set the pitch lock bleed valve for actuation at a lower r.p.m., one much closer to the normal maximum r.p.m., it is proposed to prevent operation of the pitch lock bleed during normal transient overspeeds. This is accomplished by providing a cam operated plunger which mechanically prevents the pitch lock bleed valve from closing at or near the low pitch stop. Above and below this narrow blade angle range the plunger moves away from the actuating cam so that the pitch lock bleed valve can operate normally.

Referring to FIG. 1, a propeller assembly is generally indicated at 10 as having a hub 12 having a plurality of blade retaining sockets 14 in which are mounted one or more blades 16 for pitch changing movement relative thereto. A propeller dome 17 houses a main hydraulically operated pitch changing piston 18 which through cams 20 and 22 rotates a gear 24 which engages gear segments on the base of the propeller blades, one of which is shown as a gear segment 26 for varying the pitch of the blade 16. The pitch of the blades 16 is controlled by a governor schematically illustrated at 30, which governor controls the flows of high pressure fluid from the reservoir 32 to either a low pitch line 34 or a high pitch line 36 both schematically illustrated as dotted lines in the drawing. The low pitch line 34 connects with the low pitch passage 38 which communicates with the aft side of the pitch changing piston 18 while the high pitch line 36 connects with the high pitch passage 40 and communicates with the front side of the piston 18 via an oil transfer tube 42. The governor control of pitch changing piston 18 is more fully disclosed in U.S. Patent No. 2,402,065, issued June 11, 1946, to E. Martin.

When an increase in blade pitch is required, high pressure fluid is fed via the line 36 to the high pitch passage 40 then to the oil transfer tube 42 and then out to the forward side 44 of the main pistoin 18. On the other hand, movement of the blades toward low pitch is accomplished by directing high pressure fluid to the line 34, low pitch passage 38 and then to the aft side 46 of the pitch changing piston 18.

According to this invention, a centrifugally operated valve generally indicated at 60, is located in the nose of the propeller dome 17. The valve 60 comprises a flyweight unit 62 and a valve element 64. The flyweight 62, during a predetermined overspeed, will act on bearing plate 66. Bearing plate 66 compresses the spring 74. Spring 68 is preloaded and its length remains constant until the valve 64 is seated. The valve seal 70 engages with the seat 72. If the flyweights 62 exert enough force on the bearing plate 66 to continue to force it to the right after the valve seats, then spring 68 will be compressed. Spring 68 is primarily a "lost-motion" provision whose main value is shown by its operation during the reversing and feathering cycles of the propeller. This operation is better described hereinafter. The propeller r.p.m. at which the flyweights will seat the valve seal 70 will depend on the capacity of the spring 74 and the number of adjusting shims 76 located in the assembly.

When a propeller overspeed is encountered, it is usually accompanied with a lack of sufficient pressure in the transfer tube 42 and the chamber 44, on the front side of the piston 18 to overcome blade centrifugal twisting moment which tends to move the blades toward low pitch and the piston 18 forward or outboard. Under these conditions, further movement of the blades towards a lower pitch will cause a further overspeed and possible damage to the propeller, power plant and airplane structure if not avoided. In order for the propeller blade 16 to go toward a further overspeed or lower pitch positon, it is necessary for the main servo piston 18 to move in a forward or outboard direction. Since the chamber 44 at the forward side of the piston 18 is filled with oil, a positive pitch lock can be obtained by preventing the oil in the chamber 44 from draining therefrom. Thus when an overspeed occurs, the flyweights 62 are intended to urge the valve 64 to a position whereby the seal 70 engages the seat 72, thus preventing any further oil from draining from the chamber 44 and into the oil transfer tube 42.

In order to provide a circulation of fluid when the propeller blade is at a given operating pitch, at least one of the cam roller supports 50 contains a bleed valve 52 which connects the front side 44 of the piston 18 with the aft side 46 thereof by means of passages 54, 56 and 58. A small bleed is necessary to insure a constant minimum circulation of oil under normal operating conditions, and thus maintain a minimum operating temperature of oil under low ambient temperature conditions. At the time valve 64 is closed to provide a pitch lock, it is also necessary to close off the bleed between the forward side 44 and the aft side 46 of the main piston 18. This valve is better illustrated in FIG. 2. Under normal operating conditions, the valve element 52 is held in a downward position by means of a spring 80, thereby permitting a passage of fluid from the line 54 to the line 56 which connect both sides of the piston 18. When a predetermined overspeed is encountered, the valve element 52, by centrifugal force, will move to the position shown so as to prevent passage of fluid from the line 54 to the line 56. At the same time, fluid under pressure which is trapped in the forward side 44 of the piston 18, will flow to the line 54 and then through a groove 82 and then into the chamber 84, thereby aiding the centrifugal force in holding the valve element 52 against its seat. Normally, the spring 80 will be of such a capacity that the bleeding of fluid will be prevented at some propeller speed just above take-off speed.

In normal applications, it is planned to set valve 64 so that it will close at some r.p.m. below take-off r.p.m. The setting of spring 80 in the bleed shut-off valve will determine the r.p.m. (above take-off r.p.m.) at which full pitch lock action will occur. This is done so that at the beginning of an overspeed, the main oil flow from the propeller dome will be blocked off and the r.p.m. will increase at a relatively lower rate until the bleed shut-off valve closes, finally locking the pitch. This reduced rate of approach to the final lock pitch setting prevents overshooting the set r.p.m. due to inertia effects. It also gives the pilot a little longer period to warn him that something is going wrong.

The valve 64 is designed so that feathering the propeller can be readily accomplished even when the valve is held closed with the flyweights. This feature is gained through the spring 68. If valve 64 is held closed by the flyweights, and if oil pressure is applied at the oil transfer tube side (right-hand side) of the valve, the valve can be opened readily by compressing spring 68. The oil pressure to open the valve is equal to the operating pressure (that is, back pressure) on the left-hand side of the valve plug only a very small additional amount needed to compress the spring. Thus, the operation of the pitch lock valve will not act to prevent feathering or to prevent the regaining of normal governing operation if pressure again becomes available in the oil transfer tube.

Once an overspeed occurs and valves 64 and 52 are closed, they will be held closed by the back pressure in the main dome chamber on the outboard side of piston 18. This back pressure, of course, comes from the blade centrifugal twisting moments urging the blades toward low pitch. This is an important feature and insures that, even though the pilot reduces the engine power setting or slows the airplane down to bring the r.p.m. down to a low range, the pitch lock will remain locked. It will remain locked until either (a) adequate oil pressure is applied in the oil transfer tube 42 to open valve 64, or (b) virtually all back pressure disappears behind the two valves 64 and 52, as when the propeller is stationary following a feathering operation. With this feature, it will generally be possible for the pilot to reduce the r.p.m. of an overspeeding propeller to a very moderate value by reducing throttle setting and slowing down the airplane. At this r.p.m., the drag of the windmilling propeller will be low even if the feathering system is disabled and the propeller cannot be feathered. Moreover, it is easier to get the propeller feathered if the windmilling is very low.

There are certain conditions of operation when the pitch lock will be in an engaged or active position and it is desirable to suddenly reduce the pitch of the blades. Such a condition may occur during take-off where a malfunction will cause the hydraulic pitch locks to engage and then the pilot desires to suddenly reverse the propellers to provide a braking effect. To this end a means is provided for mechanically forcibly unseating the valve element 64 so that there is a free flow of fluid from the chamber 44 into the oil transfer tube 42.

Returning, however, to FIG. 1, the forward end of the oil transfer tube includes a concentric inner sleeve 92 having upstanding members 94 engaged by a spring 96. The members 94 are slidable in slots 95 at the upstream end of tube 42. The spring 96 holds the sleeve 92 in the position shown so it is out of engagement with the valve element 64. However, when a reverse position of the propeller is desired, it is necessary to withdraw the mechanical pitch stop wedge 98 so that the stops 100 can be retracted to a position whereby the piston 18 is free to move to a forward position. Normally, the stop 100 would be engaged by the sleeve 102 carried by the piston 18. The operation of these mechanical low pitch stops is more clearly illustrated in U.S. Patent Number 2,843,212, filed March 1, 1954, by R. P. Lambeck and issued July 15, 1958.

In order to remove the wedge 98 from the position shown, it is neecssary to move the servo piston 110 toward the left. Since in the reversing position high pressure fluid will be fed to the aft side of the servo piston 18, i.e., chamber 46, this fluid will be available to flow into the slot 112 adjacent the aft end of the oil transfer tube. This slot 112 connects with a servo valve 113 which, when opened by this fluid, will connect slot 112, with a port 114 and then the chamber 116 on the aft side of the servo piston 110 (see the above-referred-to Patent No. 2,843,212). When the servo piston 110 moves toward the left, the oil in the chamber 118 on the forward side of the piston flows out through suitable slots (such as 95) in the oil transfer tube and then via the transfer tube 42 out to drain. As the servo piston 110 moves forward, an annular lip 119 on the forward side thereof engages one of the flange-like elements 94 on the sleeve 92. Following this and during movement of the servo piston 110 to the left, the sleeve 92 is forced to the left, thereby engaging the pitch lock valve element 64 so as to unseat this valve to permit fluid to flow from the chamber 44 into the oil transfer tube 42. Thus the hydraulic pitch lock is physically and mechanically disabled to permit a reversing of the propeller.

When the propeller has reached its extreme reverse position, it is desirable to reduce the pressure on the aft side of the pitch changing piston 18, i.e., chamber 46 to a minimum. In other words, it is desired to have only sufficient pressure exerted on the back side of the pitch changing piston 18 to keep it in a full reverse position as opposed to blade centrifugal twisting moment. Thus, although the main relief valve may be open in the 800 to 1000 p.s.i. range, a surge valve is provided which will open in approximately the 500 p.s.i. range. To this end at the right-hand end of the oil transfer tube 42 is located a surge valve generally indicated at 120. Thus a valve sleeve 122 is urged to the right by a spring 124. In the position shown, passage of fluid from the line 38 and the port 126 is prevented from flowing past the sleeve toward the passage 40. However, when sufficient pressure is built up in the chamber 38 and on the aft side of the pitch changing piston 18, pressure will build up in the chamber 130 so that pressure will act on the differential area 132 of the sleeve 122 to force it toward the left against the pressure of spring 124 to permit free passage of fluid from passage 38, port 126 and then to port 40. This, in reality, drains fluid from one side of the pitch changing piston 18 to the opposite side thereof, thereby reducing the differential pressure acting on the piston. This in turn relieves the stresses in the hub and provides only sufficient pressure to maintain the blades in a full reverse position.

While the above-described mechanism, which is that shown in application Serial No. 591,465 and Patent No. 2,855,057, has proven to be generally satisfactory, it has been found that because the bleed valve 52 remains closed even during normal operation after it has once been closed by an overspeed, it is necessary to so design the valve and its spring that it will not close during any normal airplane maneuvers. These maneuvers include a rapid opening of the throttle while the propeller is near its low pitch position such as might occur during a take-off or on an attempted landing in which the pilot is required to take off or go around again without landing.

During such maneuvers, and possibly others, a transient overspeed occurs and the bleed valve must be set so as not to close under those conditions as it would then remain closed during the remainder of the flight and prevent the circulation of warm oil through the propeller so that the oil might congeal under cold atmospheric conditions. If the bleed valve is set to close above these high transient speeds, a complete pitch lock cannot be effected until such high speed is reached and if this high speed should occur during cruise conditions where the speed might be maintained for a material length of time, the engine, particularly if it is a reciprocating engine, may be damaged or at least stressed to such a degree that tear-down and inspection is necessary before the engine can be returned to normal operation.

It is therefore desirable to set the closing speed for this bleed valve at a speed only slightly above the normal take-off speed so that if such an overspeed is attained during cruise conditions, the bleed valve will close and the pitch lock will become effective to prevent any further pitch reduction before any damage to the engine has resulted. In order to accomplish this, applicant has provided mechanism which will prevent the bleed valve from closing under normal transient overspeeds while the blades are near their low pitch position.

As an example to illustrate this feature, if the normal cruising speed of the propeller is 2400 r.p.m. and the take-off speed is 2900 r.p.m., transient overspeeds of, say, 3200 r.p.m. may occur. The main pitch lock valve 70 would close at a speed below the take-off speed, say at 2750 r.p.m. and without the present invention, the bleed valve 52 would be set to close slightly above the transient overspeed and would be about 3250 r.p.m. so that a complete pitch lock could not be obtained until a speed of 3250 r.p.m. had been obtained.

With the present invention, it is possible to set the bleed valve to close at an ordinary overspeed of, say, 2950 r.p.m. so that the complete pitch lock could be obtained at a speed of 2950 r.p.m., which would provide a much greater protection for the engine.

In order to accomplish this feature of locking out the bleed valve 50 when the blade position is adjacent its low pitch position, a cam or abutment 150 is secured to the flange 152 which secures the stationary cam 20 to the hub 12. This cam 150 extends axially into the dome 17 to contact bleed valve lock or holding mechanism indicated generally at 154 at positions of the piston 18 adjacent the low pitch position of the blades to open the bleed valve if it is closed and to lock or hold the bleed valve open and prevent its closing. The bleed valve lock mechanism is carried by piston 18 and comprises a support 156 secured to the piston as by screw 158 and supporting a cam contacting lever 160 by a pivot 162. A compression spring 164 between the support 156 and the lever 160 forces the lever into an outward or cam contacting position. A rod 166, beveled at one end at 168, is adapted to contact an extension 170 on the valve 52. The rod 166, when moved longitudinally to the left in its bearing 172, will lock the valve 52 downward against the action of centrifugal force, prevent the valve from closing and hold the valve open as long as the rod 166 is in its extreme left position. Rod 166 is pivoted to the lever 160 by a pivot 174 and is moved to the left as the lever 160 rides up the cam 150 and the rod is moved to the right as the lever 160 is moved to the right by spring 164 and moves away from the cam 150. A stop 176 limits the outward movement of the lever 160.

The piston 18 follows an angular path in its pitch changing movements, as indicated by the line 178, and it carries the lever 160 along that angular path as the piston moves in changing the propeller pitch.

It will be evident that this path will carry the lever 160 in a direction which will cause the lever to contact the beveled portion 180 of the cam 150, but will carry the lever free of the cam 150 both sides of the beveled portion 180. The beveled portion 180 is located in such a position that the lever 160 will be actuated to hold the valve 52 open when the piston 18 and blade 16 are at or slightly above the low pitch position of the propeller blades as defined by the low pitch stop 100.

Suitable clearance grooves are provided in piston 18 for the outermost portion of the cam 150 and in the flange 152 for the outermost portions of the lever 160 when the piston is in the extreme high pitch or feathered position, such as shown in FIG. 1.

From the above description, it will be apparent that mechanism has been provided for disarming the pitch lock and preventing the closing of the bleed valve 52 at positions adjacent the low pitch position of the propeller while retaining all the functions of the pitch lock at positions removed from the low pitch stop, such as the normal operating range.

Although only one embodiment of this invention has been illustrated and described herein, it is to be understood that the invention is not limited to the construction so illustrated and described but that changes and variations in the arrangement of parts may be made without deviating from the scope of the appended claims.

I claim:

1. In a propeller having a hub, a plurality of blades mounted for pitch changing movement relative thereto, a hydraulic pitch changing servo motor mounted in said hub and operative to vary the pitch of said blades, a source of fluid under pressure and a drain, a first speed responsive means for connecting either side of said motor to said source and the other to drain to control said servo motor, overspeed responsive means carried by said hub for blocking the connection of only one side of said servo with said first speed responsive means, means providing a bleed between one side of said motor and the other, means for automatically closing said bleed and means responsive to blade pitch positions preventing closing of said bleed at selected pitch positions.

2. In a propeller having a hub, a plurality of blades mounted for pitch changing movement relative thereto, a hydraulic pitch changing servo motor mounted in said hub and operative to vary the pitch of said blades, a source of fluid under pressure and a drain, a first speed responsive means for connecting either side of said motor to said source and the other to drain to control said servo motor, overspeed responsive means carried by said hub for blocking the connection of only one side of said servo with said first speed responsive means, means providing a bleed between one side of said motor and the other, means for automatically closing said bleed and means disabling said automatic closing means at selected pitch positions.

3. In a propeller having variable pitch blades, means for varying the pitch of said blades including a servo motor, having two operative sides, means conducting high pressure fluid to either of said sides of said servo motor for controlling said servo motor, said controlling means including a speed governor providing increase pitch and decrease pitch control signals, means responsive to a predetermined rotational speed of said propeller for trapping high pressure fluid in one of said sides, a bleed from one side of said motor to the other, overspeed responsive means for closing said bleed and means effective at said overspeed holding said bleed open at selected pitch positions.

4. In a propeller having a hub, a plurality of blades mounted for pitch changing movement relative thereto, a hydraulic pitch changing servo motor mounted in said hub and operative to vary the pitch of said blades, a source of fluid under pressure and a drain, a first speed responsive means for connecting either side of said motor to said source and the other to drain to control said servo motor, overspeed responsive means carried by said hub for blocking the connection of only one side of said servo with said first speed responsive means, means providing a bleed between one side of said motor and the other, a second speed responsive means for automatically closing said bleed, and means disabling said second speed responsive means and holding said bleed open at selected pitch positions.

5. In a propeller having a hub, a plurality of blades mounted for pitch changing movement relative thereto, a hydraulic pitch changing servo motor mounted in said hub and operative to vary the pitch of said blades, a source of fluid under pressure and a drain, a first speed responsive means for connecting either side of said motor to said source and the other to drain to control said servo motor, overspeed responsive means carried by said hub for blocking the connection of only one side of said servo with said first speed responsive means, means providing a bleed between one side of said motor and the other, a second speed responsive means for automatically closing said bleed at a preselected speed and means, effective at selected pitch positions, preventing said second speed responsive means from closing said bleed at said preselected speed.

6. In a propeller having a normal speed, and a take-off speed higher than said normal speed and having a plurality of blades mounted for pitch changing movement, a hydraulic pitch changing servo motor operative to vary the pitch of said blades, a source of fluid under pressure and a drain, a first speed responsive means for connecting either side of said motor to said source and the other to drain to control said servo motor to maintain said propeller at a selected speed, means responsive to a speed above said normal speed but less than said take-off speed for blocking the connection of only one side of said servo with said first speed responsive means, means providing a bleed between one side of said motor and the other, and means responsive to a predetermined speed higher than said take-off speed for automatically closing said bleed and means preventing closing of said bleed at said predetermined speed including means mechanically locking said bleed open at selected pitch positions.

7. In a controllable pitch propeller having a low pitch position and a preselected take-off speed, a safe overspeed slightly above said take-off speed, a hydraulically actuated motor for changing the propeller pitch, a bleed valve connecting opposite sides of said motor for circulating hydraulic fluid, said valve being centrifugally actuated by rotation of said propeller at said safe overspeed to block said bleed to assist in trapping hydraulic fluid on one side of said motor to prevent further pitch reduction and means preventing closing of said valve at said safe overspeed at selected pitch positions adjacent said low pitch position.

8. In a controllable pitch propeller having a low pitch position and a preselected take-off speed, an ordinary overspeed slightly above said take-off speed, and subject to temporary overspeed excursions above said ordinary overspeed when the propeller pitch is adjacent its low pitch position, a hydraulically actuated motor for changing the propeller pitch, a bleed valve connecting opposite sides of said motor for circulating hydraulic fluid, said valve being centrifugally actuated by rotation of said propeller at said ordinary overspeed to block said bleed to assist in trapping hydraulic fluid on one side of said motor to prevent further pitch reduction and means holding said valve open during said temporary overspeed excursions.

9. In hydraulic propeller pitch changing mechanism having a low pitch position and having a motor and means for regulating the hydraulic pressure on opposite sides of said motor to actuate said mechanism, means, including a valve urged to closed position by centrifugal force incident to rotation of said propeller, connecting opposite sides of said motor to circulate hydraulic fluid through said mechanism, spring means urging said valve to open position, said valve being retained in closed position by the pressure difference on opposite sides of said motor, means preventing said valve from closing on normal overspeeds at positions adjacent said low pitch position but ineffective to prevent closing of said valve at said same speeds at higher pitch positions.

10. A device as claimed in claim 9 in which said preventing means comprises means carried by said motor coacting with means fixed on said propeller and urging said valve to open position.

11. A device as claimed in claim 1 in which said preventing means comprises an abutment carried by said hub and means movable by said motor and coacting with said abutment and said valve at said selected pitch positions.

References Cited in the file of this patent

UNITED STATES PATENTS 2,855,057    Van Alstyne _____ Oct. 7, 1958